(12) United States Patent
Newman et al.

(10) Patent No.: US 11,438,762 B2
(45) Date of Patent: Sep. 6, 2022

(54) VEHICLE CONNECTIVITY, V2X COMMUNICATION, AND 5G/6G SIDELINK MESSAGING

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: AUTONOMOUS ROADWAY INTELLIGENCE, LLC, Palos Verdes, CA (US)

( * ) Notice: Subject to any disclaimer, the term of this patent is extended or adjusted under 35 U.S.C. 154(b) by 0 days.

(21) Appl. No.: 17/583,395

(22) Filed: Jan. 25, 2022

(65) Prior Publication Data

US 2022/0150689 A1 May 12, 2022

Related U.S. Application Data

(60) Provisional application No. 63/290,731, filed on Dec. 17, 2021, provisional application No. 63/288,807, (Continued)

(51) Int. Cl.
*H04M 1/00* (2006.01)
*G06F 17/30* (2006.01)
(Continued)

(52) U.S. Cl.
CPC ............. *H04W 8/26* (2013.01); *G01S 5/0063* (2013.01); *G01S 19/256* (2013.01);
(Continued)

(58) Field of Classification Search
CPC ......... H04W 8/26; H04W 4/46; H04W 4/029; H04W 4/90; H04W 4/40; G01S 5/0063;
(Continued)

(56) References Cited

U.S. PATENT DOCUMENTS 8,520,695 B1 8/2013 Rubin
10,032,384 B1 * 7/2018 Boyd .................. G08G 5/0069
(Continued)

*Primary Examiner* — Mark G. Pannell
(74) *Attorney, Agent, or Firm* — Mayer & Williams PC

(57) ABSTRACT

Communication between autonomous vehicles, in 5G or 6G, is necessary for cooperative hazard avoidance and to coordinate the flow of traffic. However, before cooperative action, each vehicle must determine the wireless address of other vehicles in proximity, so that they can communicate directly with each other. Methods and systems disclosed herein include a computer-readable wireless "connectivity matrix", an array of black and white squares showing a connectivity code. The connectivity code may be the vehicle's wireless address, an index code, or other information about the vehicle. The connectivity code may be an index in a tabulation of information that provides the wireless address, among other data. Other vehicles, or their cameras, may read the connectivity matrix, determine the code therein, and find the vehicle's wireless address. After determining the wireless address of the other vehicles, the vehicles can then communicate and cooperate to avoid accidents and facilitate the flow of traffic.

18 Claims, 5 Drawing Sheets

Related U.S. Application Data filed on Dec. 13, 2021, provisional application No. 63/288,237, filed on Dec. 10, 2021, provisional application No. 63/287,428, filed on Dec. 8, 2021, provisional application No. 63/272,352, filed on Oct. 27, 2021, provisional application No. 63/271,335, filed on Oct. 25, 2021, provisional application No. 63/256,042, filed on Oct. 15, 2021, provisional application No. 63/246,000, filed on Sep. 20, 2021, provisional application No. 63/245,227, filed on Sep. 17, 2021, provisional application No. 63/243,437, filed on Sep. 13, 2021, provisional application No. 63/260,814, filed on Sep. 1, 2021.

(51) Int. Cl.

| | |
|---|---|
| *H04W 8/26* | (2009.01) |
| *G06K 19/06* | (2006.01) |
| *H04W 4/029* | (2018.01) |
| *H04W 4/90* | (2018.01) |
| *H04W 4/40* | (2018.01) |
| *G01S 5/00* | (2006.01) |
| *G01S 19/25* | (2010.01) |
| *H04W 4/46* | (2018.01) |
| *G08G 1/01* | (2006.01) |
| *G08G 1/017* | (2006.01) |
| *G08G 1/04* | (2006.01) |
| *G08G 1/056* | (2006.01) |
| *G08G 1/09* | (2006.01) |
| *G08G 1/137* | (2006.01) |
| *G08G 1/16* | (2006.01) |

(52) U.S. Cl.
CPC ....... *G06K 19/06037* (2013.01); *G08G 1/017* (2013.01); *G08G 1/0145* (2013.01); *G08G 1/04* (2013.01); *G08G 1/056* (2013.01); *G08G 1/091* (2013.01); *G08G 1/137* (2013.01); *G08G 1/161* (2013.01); *G08G 1/162* (2013.01); *G08G 1/166* (2013.01); *G08G 1/167* (2013.01); *H04W 4/029* (2018.02); *H04W 4/40* (2018.02); *H04W 4/46* (2018.02); *H04W 4/90* (2018.02)

(58) Field of Classification Search
CPC ............ G01S 19/256; G06K 19/06037; G08G 1/0145; G08G 1/01; G08G 1/07; G08G 1/04; G08G 1/056; G08G 1/091; G08G 1/137; G08G 1/161; G08G 1/162; G08G 1/166; G08G 1/167

USPC ......................................................... 455/561
See application file for complete search history.

(56) References Cited

U.S. PATENT DOCUMENTS

| | | | |
|---|---|---|---|
| 2001/0051915 A1* | 12/2001 | Ueno | G07F 7/1008 705/39 |
| 2010/0256852 A1 | 10/2010 | Mudalige | |
| 2013/0115881 A1* | 5/2013 | Liao | H04W 12/50 455/41.2 |
| 2013/0203400 A1 | 8/2013 | Ricci | |
| 2014/0117076 A1* | 5/2014 | Eberlein | G06F 16/9566 235/375 |
| 2015/0082410 A1* | 3/2015 | Fitzgerald | H04L 63/08 726/9 |
| 2016/0077213 A1 | 3/2016 | Xianglin | |
| 2017/0018187 A1 | 1/2017 | Kim | |
| 2017/0146660 A1 | 5/2017 | Xu | |
| 2017/0176599 A1 | 6/2017 | Hay | |
| 2017/0212510 A1 | 7/2017 | Nordbruch | |
| 2017/0285176 A1 | 10/2017 | Croyle | |
| 2017/0294117 A1* | 10/2017 | Burke | G08G 1/0129 |
| 2017/0331734 A1 | 11/2017 | Cariou | |
| 2018/0113472 A1 | 4/2018 | Sakr | |
| 2018/0160419 A1 | 6/2018 | Jiang | |
| 2018/0208140 A1 | 7/2018 | Sugimoto | |
| 2018/0314763 A1* | 11/2018 | Corghi | G01B 11/275 |
| 2018/0328734 A1 | 11/2018 | Kasslatter | |
| 2019/0069051 A1 | 2/2019 | Al-Stouhi | |
| 2019/0094385 A1 | 3/2019 | Laurichesse | |
| 2019/0239040 A1 | 8/2019 | Va | |
| 2019/0250616 A1* | 8/2019 | Ramanujam | G07C 5/085 |
| 2019/0261258 A1* | 8/2019 | Lindoff | H04W 48/16 |
| 2019/0303048 A1* | 10/2019 | Suzuki | G06F 3/1292 |
| 2020/0041604 A1 | 2/2020 | Kim | |
| 2020/0178039 A1 | 6/2020 | Lee | |
| 2020/0336541 A1 | 10/2020 | Alizadeh | |
| 2021/0018630 A1 | 1/2021 | Mueller | |
| 2021/0096215 A1 | 4/2021 | Slobodyanyuk | |
| 2021/0132233 A1 | 5/2021 | Govindillam | |
| 2021/0150895 A1 | 5/2021 | Huang | |
| 2021/0273714 A1* | 9/2021 | Lee | H04B 7/088 |
| 2021/0286044 A1 | 9/2021 | Knuuttila | |
| 2021/0318450 A1 | 10/2021 | Tomita | |
| 2021/0331666 A1* | 10/2021 | Meng | G08G 1/096708 |
| 2021/0377760 A1 | 12/2021 | Guo | |
| 2021/0390499 A1* | 12/2021 | Corrodi | G06F 16/9566 |
| 2022/0050175 A1* | 2/2022 | Shin | G01S 7/415 |

* cited by examiner

VEHICLE CONNECTIVITY, V2X COMMUNICATION, AND 5G/6G SIDELINK MESSAGING

PRIORITY CLAIMS AND RELATED APPLICATIONS

This application claims the benefit of U.S. Provisional Patent Application Ser. No. 63/260,814, entitled "Localization and Identification of Vehicles in Traffic by 5G Messaging", filed Sep. 1, 2021, and U.S. Provisional Patent Application Ser. No. 63/243,437, entitled "V2X Messaging in 5G with Simultaneous GPS Reception", filed Sep. 13, 2021, and U.S. Provisional Patent Application Ser. No. 63/245,227, entitled "V2X with 5G Image Exchange and AI-Based Viewpoint Fusion", filed Sep. 17, 2021, and U.S. Provisional Patent Application Ser. No. 63/246,000, entitled "V2X Connectivity Matrix with 5G Sidelink", filed Sep. 20, 2021, and U.S. Provisional Patent Application Ser. No. 63/256,042, entitled "Hailing Procedure for V2R, V2V and V2X Initial Contact in 5G", filed Oct. 15, 2021, and U.S. Provisional Patent Application Ser. No. 63/271,335, entitled "Semaphore Messages for Rapid 5G and 6G Network Selection", filed Oct. 25, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/287,428, entitled "V2X and Vehicle Localization by Local Map Exchange in 5G/6G", filed Dec. 8, 2021, and U.S. Provisional Patent Application Ser. No. 63/288,237, entitled "V2X with 5G/6G Image Exchange and AI-Based Viewpoint Fusion", filed Dec. 10, 2021, and U.S. Provisional Patent Application Ser. No. 63/288,807, entitled "V2X Messaging in 5G/6G with Simultaneous GPS Reception", filed Dec. 13, 2021, and U.S. Provisional Patent Application Ser. No. 63/290,731, entitled "Vehicle Connectivity, V2X Communication, and 5G/6G Sidelink Messaging", filed Dec. 17, 2021, all of which are hereby incorporated by reference in their entireties.

FIELD OF THE INVENTION

The invention relates to systems and methods for localizing, identifying, and communicating with vehicles in traffic and fixed assets.

BACKGROUND OF THE INVENTION

Autonomous vehicles in traffic can cooperate, for collision avoidance and traffic efficiency, after determining the wireless address of the other vehicles. However, the wireless addresses of passing vehicles are generally unknown. Mobile entities often need to communicate specifically with fixed assets in view, which requires knowing which wireless address belongs to which vehicle. What is needed is means for determining the wireless address of specific entities in proximity.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a wireless entity comprising: a matrix comprising a plurality of square or rectangular fields, the matrix displayed visually in or on the wireless entity, the fields arranged in a rectangular array, each field colored either black or white according to a binary code, the binary code comprising data related to a wireless address of the wireless entity.

In another aspect, there is non-transitory computer-readable media in a first vehicle, the media including instructions that when executed by a computing environment cause a method to be performed, the method comprising: detecting, in or on a second vehicle, a connectivity matrix comprising a plurality of fields colored black or white according to a code; and determining, from the code, a wireless address of the second vehicle.

In another aspect, there is a base station of a wireless network, the base station comprising: a visibly displayed connectivity matrix comprising a plurality of fields arranged in a rectangular array, each field colored black or white according to a code, the code configured to indicate a particular frequency; and a transmitter configured to transmit system information messages on the particular frequency.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
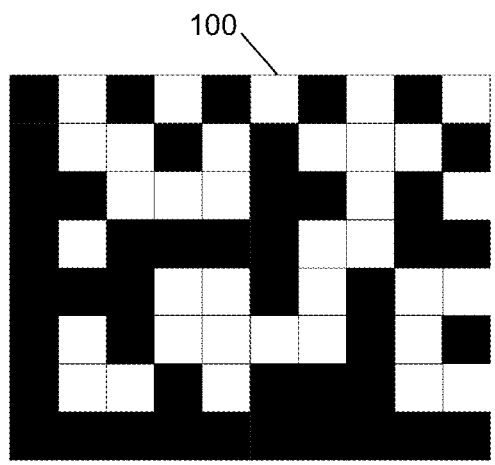
FIG. 1A is a schematic sketch of an exemplary embodiment of a computer-readable wireless identification matrix, according to some embodiments.

Disclosed herein are 5G/6G procedures that enable autonomous and semi-autonomous vehicles to determine the wireless addresses of other autonomous vehicles and other items in traffic, using a low-cost computer-readable "connectivity matrix", and optionally a tabulation of wireless addresses. Systems and methods disclosed herein (the "systems" and "methods", also occasionally termed "embodiments" or "arrangements", generally according to present principles) can provide urgently needed wireless communication protocols to provide specific wireless connectivity rapidly in traffic, thereby enabling cooperation and communication among vehicles and fixed assets. With such capabilities, vehicles can reduce traffic fatalities, facilitate traffic flow, and provide V2V and V2X communication options appropriate for 5G and 6G technologies, according to some embodiments.

Cooperation among autonomous vehicles in traffic depends on each vehicle being able to communicate specifically with a particular one of the other vehicles. However, this is possible only if the transmitting vehicle knows the wireless address of the other vehicle. In addition, a vehicle may advantageously communicate with a fixed asset on the land, but this also requires that the vehicle knows the associated frequency and wireless address. Furthermore, the fixed asset may need to initiate communication with the vehicle, for example to warn the vehicle of a hazard, but must first determine the wireless address of the vehicle.

Beamforming has been considered as a method for communicating specifically with a single intended recipient. In beamforming, a complex antenna is configured to transmit a directional "beam" message toward the other vehicle. However, such beams inevitably have side-lobes which can spill over onto adjacent vehicles, especially in adjacent lanes. In addition, reflected energy from metallic conductors, such as vehicles, interfere with the primary beam and further complicate beam specificity. In addition, beam energy inevitably continues traveling beyond the intended recipient, and may then be received by other vehicles in the same direction.

The systems and methods described below can provide greater specificity at low cost. An entity such as a vehicle or fixed asset may display a "connectivity matrix", a rectangular array of black and white fields encoding the wireless address and/or other data of the entity. Other wireless entities can determine the "connectivity code" according to the black and white fields, and thereby communicate specifically with the entity, according to some embodiments.

As used herein, a device or entity "knows" something if the device or entity has the relevant information. An "autonomous" vehicle is a vehicle operated by a processor, with little or no human control most of the time. A "semi-autonomous" vehicle is a vehicle at least partially operated by a processor, or which can be fully operated by a processor temporarily, such as during emergency intervention. A wireless message is "unicast" if it is addressed specifically to a particular recipient, and "broadcast" if it is transmitted without specifying a recipient. "V2V" means vehicle-to-vehicle messaging. "V2X" means vehicle-to-everything messaging. A "vehicle" is to be construed broadly, including any mobile conveyance such as cars, trucks, busses, motorcycles, scooters, and the like. "Entities" (such as wireless entities) as used herein represents systems or devices capable of wireless communication such as connected vehicles, pedestrians with smart phones, roadside access points or base stations, and so forth. "Fixed assets" include non-mobile objects that either include or are associated with a wireless transceiver. Wireless communication with a vehicle may include communicating with a processor in that vehicle, such as a processor connected to a wireless transceiver. Likewise a vehicle may transmit a message by causing the transceiver to transmit a message provided by the processor. A "sequence chart" is a chart showing actions of various entities versus time as boxes along horizontal lines, similar to an oscilloscope or logic analyzer display. Further terms will be defined as needed in examples.

Disclosed is a "computer-readable wireless identification matrix" or "connectivity matrix", configured as a sign or emblem displayed visibly on a vehicle or other wireless entity. The connectivity matrix includes multiple black and white fields in a visible computer-readable array, encoding a "connectivity code" such as the entity's wireless address and/or other information about the entity. For example, there may be a tabulation of wireless addresses arranged according to an index code, and the connectivity code may include that index. Another entity, reading the connectivity code, may then obtain the wireless address from the tabulation. In some embodiments, the connectivity matrix may be configured as a two-dimensional array of black and white (or other contrasting) squares representing binary bits. The connectivity matrix may be formatted as a DataMatrix array, a QR type array, or other computer-readable representation of information. Usually the connectivity matrix is displayed exteriorly on a vehicle or other wireless entity. Other vehicles (or their cameras or other sensors) can readily view the matrix and record its bit-level content. By reading or viewing or recording the connectivity matrix, with sufficient resolution to resolve the various black and white fields therein, a vehicle or other entity can determine the connectivity code displayed by the matrix. In some embodiments, the wireless address of the entity bearing the connectivity matrix is shown on the code directly. In other embodiments, the code is an index of a tabulation of entries, each entry containing the wireless address associated with that index value, among other information about the entity bearing the connectivity matrix. After finding the wireless address, the entities can then communicate specifically, thereby enabling V2V and V2X communication and intervehicle cooperation in traffic to avoid collisions and manage the traffic flow, according to some embodiments.

The connectivity matrix may be variable. In some embodiments, the connectivity matrix can be turned on and off. For example, when a driver switches from autonomous mode to human-operated mode, the processor is no longer in control of the vehicle, and therefore communication on its wireless address would be futile. Accordingly, the connectivity matrix may be turned off, or rendered non-visible, to avoid sending conflicting information to other vehicles. For example, the white fields in the connectivity matrix may be illuminated by small light emitters such as white LEDs (light-emitting diodes), which may be turned off when the vehicle is switched to non-autonomous mode (thus rendering the connectivity matrix all black) and switched on when in autonomous mode. Alternatively, if the vehicle retains an emergency intervention capability while in human-operated mode, then the connectivity matrix may be left on during that time, so that other vehicles can trigger the emergency intervention when necessary to avoid a traffic hazard, for example. In addition, the connectivity code may be changed by programming a different set of LEDs to be illuminated, thereby updating the code or the wireless address displayed on the connectivity matrix, according to some embodiments.

Also disclosed is a "wireless address tabulation", which is a file or database or other collection of information, organized as a number of entries, each entry corresponding to a particular index value, which may be indicated by a connectivity code. Each entry of the tabulation includes a wireless address associated with each connectivity code. Each entry may also include data about a particular autonomous vehicle or other wireless entity. For example, the data in a particular entry, associated with a particular connectivity code, may include the wireless address of the entity that holds a matrix displaying that particular connectivity code. For example, the entity may be a vehicle or a fixed asset or other device or system configured for wireless communication. In some embodiments, each entry of the wireless address tabulation may provide the wireless address, such as the MAC (media access control) address, of the vehicle or entity holding the associated connectivity code. Other parameters, such as frequencies and bandwidths and default modulations, may also be included, according to some embodiments.

In an embodiment, the tabulation of wireless addresses may be publicly accessible on, for example, the Internet and/or other on-line compilations of information. Members of the general public may be able to download, or otherwise copy, the wireless address tabulation, or regional portions thereof. Using such a copy, a vehicle or other entity can look up the wireless address of another vehicle or entity that displays a connectivity matrix. By reading the connectivity code displayed on the matrix, and then selecting the associated entry in the wireless address tabulation, the wireless address and other information about the entity displaying the connectivity matrix may be obtained. For example, a first vehicle may copy or otherwise obtain the wireless address tabulation, or a portion thereof, and may retain it in a memory. The first vehicle may view a second vehicle in traffic, and may read the connectivity code on a connectivity matrix displayed by the second vehicle. The first vehicle may then find, in the copied wireless address tabulation, an entry corresponding to that connectivity code, and may read the wireless address contained in that entry. The first vehicle can then communicate with the second vehicle by transmitting a message using the second vehicle's wireless address, as determined from the tabulation, according to some embodiments.

In another embodiment, a vehicle may determine another vehicle's wireless address without possessing a copy of the wireless address tabulation. For example, a first vehicle in traffic may view a second vehicle's connectivity matrix and read the code therein. The first vehicle may then transmit an interrogation message to a remote address or site (such as an Internet site) operated by a connectivity manager. The request message may specify the connectivity code and may request the associated wireless address. The connectivity manager may then reply with that wireless address. The connectivity manager may be an entity tasked with maintaining the wireless address tabulation, and may provide wireless addresses responsive to such requests, for example. The connectivity manager may also provide other data such as publicly available identification data, such as the license plate of the vehicle associated with that connectivity code. The connectivity manager may be a government agency, a publicly funded corporation, an international organization, or other entity. If the message requests just the wireless address associated with the specified connectivity code, then the manager may reply with that address. If the message requests the entire entry associated with the specified connectivity code, the manager may provide the entire entry, according to some embodiments.

In another embodiment, a fixed asset such as a roadside device or building may display a connectivity matrix showing the wireless address of that fixed asset. For example, a network asset may display a connectivity matrix showing its main address or frequency on which new users may connect with the network. The connectivity code may indicate how new users can obtain system information from that network asset and begin registering on the network. For example, the connectivity code may indicate a frequency of the base station's broadcast channel on which system information is periodically transmitted, thereby avoiding a tedious blind search and other steps in gaining registration, according to some embodiments.

In another embodiment, the connectivity matrix may be variable. The connectivity matrix structure may include illuminators and/or variable fields, so that the connectivity code may be changed when necessary, and turned off when not in use. For example, each white field may be illuminated by a small white LED, and the connectivity code determines which of the LEDs are illuminated. Alternatively, the black and white fields may be controlled by solid-state shutters such as liquid-crystal squares that can be changed from opaque to transparent by applying a voltage. The connectivity code can then be changed by changing which voltage is applied to each of the fields. The matrix may be back-illuminated by, for example, built-in light emitters, or it may use ambient light for contrast between the light and dark fields, according to some embodiments.

In some embodiments, a first vehicle in traffic can determine the wireless address of a second vehicle by reading the second vehicle's connectivity matrix using, for example, a camera. The first vehicle can then transmit a unicast message addressed exclusively to the second vehicle using, for example, a sidelink channel or other frequency allocated for V2V or V2X communication. The wireless messages may be transmitted according to 5G or 6G sidelink specifications. For example, if an access point or base station is within range, the communication may be transmitted according to 5G/6G sidelink "mode-1", in which the base station sets the timing and manages the vehicle messages. If no network interface is available, the vehicles may set up a "mode-2" sidelink network in which the timing and bandwidths are managed by the vehicles themselves. Alternatively, the vehicles may transmit their messages according to another technology such as Wi-Fi or transmitting at-will, for example.

In some embodiments, the connectivity code can indicate further information about the vehicle or entity bearing the connectivity matrix, such as whether the vehicle is autonomous, semi-autonomous, or exclusively human-operated. Alternatively, that information may be included in the vehicle's entry in the wireless address tabulation. Thus a first vehicle may read the connectivity code of a second vehicle and transmit a message to the second vehicle indicating the first vehicle's wireless address, so that the second vehicle can then send other messages to the first vehicle unicast. In some embodiments, the first vehicle can include, in its message to the second vehicle, information indicating the first vehicle's physical position relative to the second vehicle, so that the second vehicle can determine which of the proximate vehicles is transmitting the message. For example, the first vehicle's message may include data indicating that the first vehicle is "35 meters behind you and one lane to the left", and sensors on the second vehicle can view the first vehicle accordingly. The vehicles can then associate the other vehicle's wireless address with the particular vehicle observed, and can follow or track each other as they move in traffic.

In some embodiments, vehicles in traffic may be configured to obtain the wireless addresses of proximate vehicles proactively. For example a first vehicle may look up the wireless addresses of other vehicles that display a connectivity matrix, as soon as they come into view, and this may be done automatically even when there is no message to send. Then, if an emergency suddenly arises, the first vehicle can initiate communication with the other vehicles immediately, saving valuable time.

Examples described below provide further details about certain exemplary embodiments of the present principles.

FIG. 1A is a schematic sketch of an exemplary embodiment of a computer-readable wireless identification matrix, according to some embodiments. As depicted in this non-limiting example, the connectivity matrix 100 may include a plurality of black and white (or other contrasting color), nominally square, adjacent fields in a rectangular or square array, each field colored to indicate one binary bit of a connectivity code. For example, black may represent binary "0" and white may represent binary "1", or vice-versa. The depicted example is formatted as a DataMatrix array including 48 information bits surrounded by a black and white orientation border (black on left and bottom borders, alternating black and white across the top and right side). Other two-dimensional formats, such as QR (Quick Response) code, Aztec code, Trillcode, Quickmark, Shotcode, mCode, and one-dimensional formats, such as UPC or BarCode, and special fonts such as Check Font may be used instead. The 48-bit code may be the vehicle's MAC address, for example. Other vehicles, detecting the connectivity matrix 100 using sensors, and reading the 48-bit code using a camera for example, may thereby determine that vehicle's wireless address and may then communicate specifically with that vehicle. For example, a first vehicle in traffic may detect an imminent collision with a second vehicle in front, and may read the second vehicle's connectivity matrix 100, thereby determining the second vehicle's wireless address. The first vehicle may then transmit an emergency message to the second vehicle asking it to speed up quickly, to avoid a collision. In this way, the connectivity matrix 100 may enable cooperative actions by vehicles in traffic, and may thereby prevent or mitigate collisions, saving countless lives, according to some embodiments.

Figure 1B:
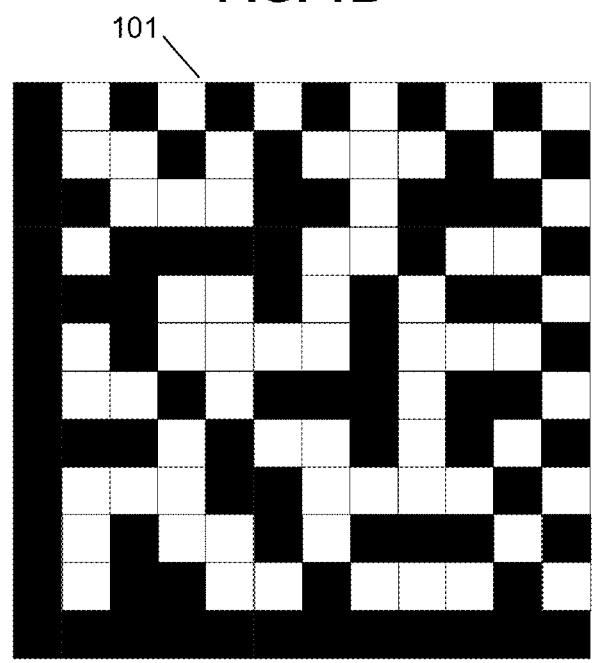
FIG. 1B is a schematic sketch of another exemplary embodiment of a computer-readable wireless identification matrix, according to some embodiments.

FIG. 1B is a schematic sketch of another exemplary embodiment of a computer-readable wireless identification matrix, according to some embodiments. As depicted in this non-limiting example, a larger connectivity matrix 101 includes 100 data squares surrounded by an orientation border. The connectivity matrix 101 may be affixed to a vehicle or other wireless entity, thereby allocating a unique 100-bit code to the entity. A vehicle may display the connectivity matrix on, for example, the front and back, and optionally also the sides, of the vehicle, so that other vehicles can view the pattern and read the code.

In some embodiments, a connectivity manager may be responsible for allocating the connectivity codes to various entities that request them. The connectivity manager may thereby maintain a wireless address tabulation in which each registered vehicle in the tabulation has an associated entry, the entry is associated with the vehicle's displayed connectivity code, each code is uniquely assigned, and duplicates are avoided. Each vehicle's entry in the wireless address tabulation may be a listing of that vehicle's allocated connectivity code along with its wireless address, and optionally other information of the vehicle or entity holding that code.

In some embodiments, when a first vehicle in traffic needs to transmit a message to a second vehicle displaying a connectivity matrix, the first vehicle can obtain the connectivity code from the matrix image, and then look up the second vehicle's wireless address corresponding to that connectivity code in a copy of the wireless address tabulation (or a portion thereof). Alternatively, if the first vehicle does not possess a copy of the wireless address tabulation, it may transmit a message to the connectivity manager requesting the wireless address corresponding to the connectivity matrix, which the connectivity manager may then supply in a return message. As another alternative, the second vehicle's matrix may indicate, in the bit pattern, the wireless address of the second vehicle. In each case, the first vehicle can determine the wireless address of the second vehicle according to the connectivity code displayed by the second vehicle, and can then transmit a message specifically to the second vehicle using the second vehicle's wireless address. Optionally, the first vehicle may include its own wireless address in the message, so that the second vehicle can reply specifically to the first vehicle. Optionally, the connectivity manager may supply further data about the second vehicle, such as its license plate code, whether it is autonomous, and other wireless parameters, if requested.

In some embodiments, the wireless address tabulation may provide only publicly available information that vehicles in traffic may need to communicate V2V and V2X. The publicly available information may include readily visible information, such as the type and color of vehicle, its license plate, and other readily visible information. All other information, other than readily visible features and public information, may be considered private and may be excluded from the tabulation.

In some embodiments, an autonomous vehicle or a person or other entity may transmit a registration request message to the connectivity manager specifying the vehicle's MAC address, and the connectivity manager may set up an entry in the wireless address tabulation using a randomly selected connectivity code. The connectivity manager may include that wireless address in the entry, and may transmit the assigned connectivity code back to the vehicle. The connectivity matrix can then be printed, or otherwise fabricated, with the associated connectivity code.

In some embodiments, a vehicle or owner may register in the wireless address tabulation by specifying a particular connectivity code that the vehicle or owner wishes to use. For example, the desired code may include the vehicle's wireless address. If the requested code is available, the connectivity manager may generate an entry with that code as the index. The vehicle may then display a connectivity matrix with that code, so that other vehicles may read the code and determine the wireless address directly, without having to interrogate the connectivity manager or look up the entry in the wireless address tabulation. For example, the 48-bit MAC address may be encoded in a region of the connectivity matrix, and vehicles viewing the connectivity matrix may determine the wireless address of the vehicle without using a wireless address tabulation. As a particular and non-limiting embodiment, the first 24 bits may be encoded with the ASCII (American Standard Code for Information Interchange) code for "MAC", followed by the 48-bit MAC address of the vehicle's autonomous processor, followed by other information such as a frequency in the final 28 bits. In some embodiments, some of those bits may be allocated to error detection, such as parity bits.

In some embodiments, the wireless address obtained using the connectivity code or the wireless address tabulation may be an address code of a particular processor on that vehicle. For example, the address code may be the address of a message-entry processor connected to the wireless receiver in an autonomous or semi-autonomous vehicle. The message-entry processor may be configured to analyze incoming messages to detect malware or other inappropriate messaging, and to protect the system against malicious intent. In some embodiments, the message-entry processor (or another processor in the vehicle) may include artificial intelligence (AI) configured to detect malicious messages, and to recognize and prioritize emergency messages and other types of legitimate wireless activity. For example, an AI structure such as a neural net may be trained by machine learning to discriminate different types of communications, thereby enabling a rapid cooperative response to a legitimate collision-avoidance request, while rejecting harmful or deceptive communication attempts. In addition, the message-entry processor may include an updating feature whereby the AI structure, or an algorithm derived from it for field use, may be revised periodically, using a secure on-line connection for example, to provide the most up-to-date malware detection algorithms. In addition, the message-entry processor may record messages that seem suspicious, and may upload those periodically to a central entity tasked with detecting new threat patterns.

Figure 1C:
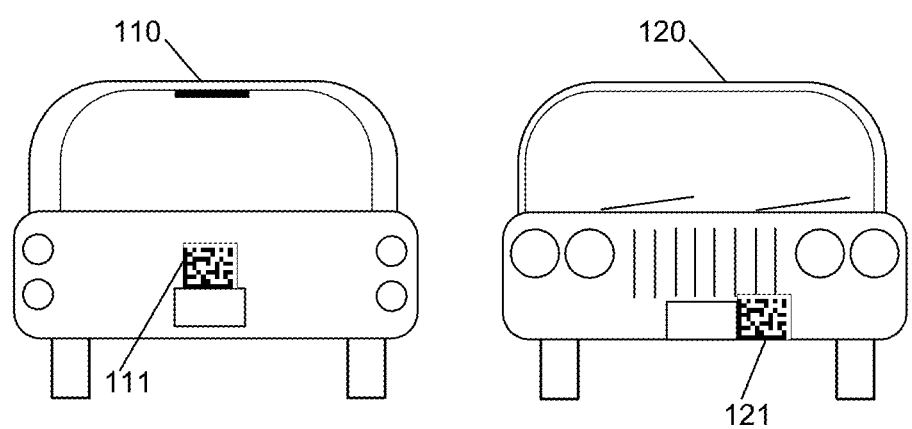
FIG. 1C is a schematic sketch of an exemplary embodiment of computer-readable wireless identification matrix on vehicles, according to some embodiments.

FIG. 1C is a schematic sketch of an exemplary embodiment of computer-readable wireless identification matrix on vehicles, according to some embodiments. As depicted in this non-limiting example, a vehicle 110 is shown with a connectivity matrix 111 mounted on the back, and a second vehicle 120 with a connectivity matrix 121 on the front. In some embodiments, the connectivity matrixes 111-121 are large enough that other vehicles, or their cameras or sensors, can detect the individual fields with high reliability, yet not so large as to obscure other parts of the vehicle (the license plate, various lamps, the radiator screen, the trunk handle, for example). In some embodiments, the connectivity matrix is large enough to be resolved by cameras or sensors on vehicles at a distance corresponding to vehicle separations in traffic, such as 20 or 50 or 100 meters. In some embodiments, each black or white field is large enough to be readily viewed and resolved by other vehicles, such as each field being 5 or 10 or 20 mm in width and height.

Figure 2A:
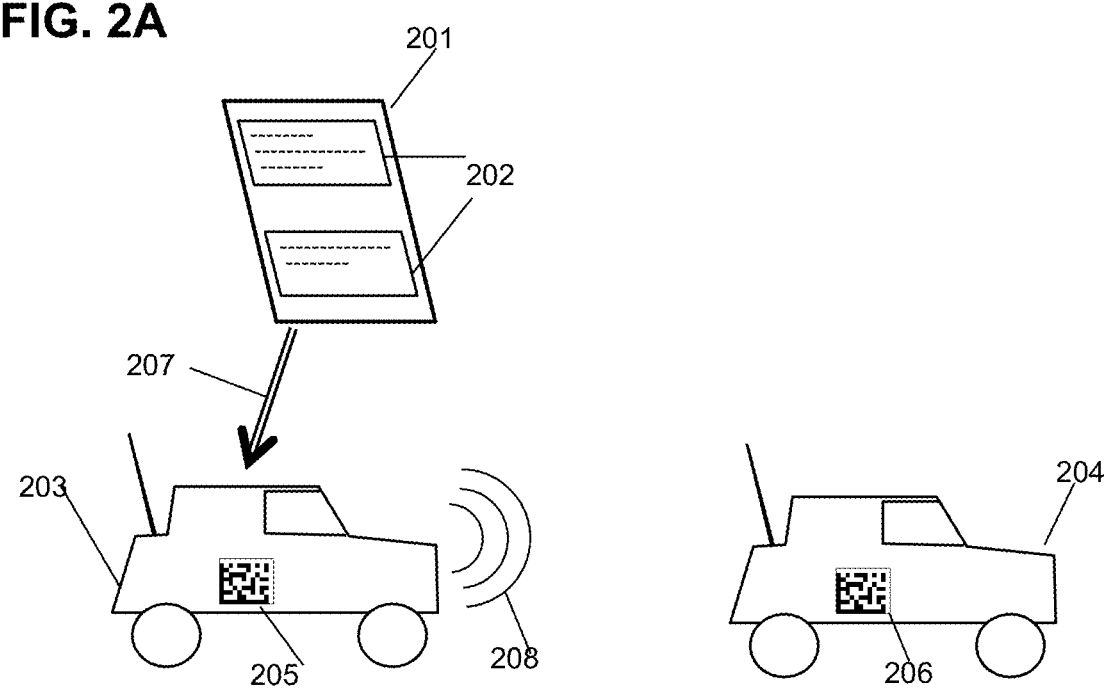
FIG. 2A is a schematic sketch of an exemplary embodiment of a wireless address tabulation, according to some embodiments.

FIG. 2A is a schematic sketch of an exemplary embodiment of a wireless address tabulation, according to some embodiments. As depicted in this non-limiting example, the wireless address tabulation 201 is depicted, quite schematically, as a paper containing entries 202, each entry 202 corresponding to an assigned connectivity code. However, the wireless address tabulation 201 is envisioned as an electronic file or the like, not as a paper, unless someone wants to print it out. Also depicted are a first autonomous vehicle 203 bearing a first connectivity matrix 205, and a second autonomous vehicle 204 with a second connectivity matrix 206. In this embodiment, the connectivity matrixes 205-206 are mounted on the sides of the vehicles 203-204, while additional copies may be mounted on the front and back of the vehicles 203-204, not shown.

In the example, the first vehicle 203 has downloaded the wireless address tabulation 201, as indicated by an arrow 207, and has stored it in non-transitory computer-readable media for mobile use, particularly when out of range of a network. Suddenly an emergency arises, and the first vehicle 203 needs to send a message 208 to the second vehicle 204, enlisting its support for a collision avoidance maneuver. The first vehicle, using its camera, reads the code contained in the second vehicle's connectivity matrix 206 (if it has not already done so), then looks in the wireless address tabulation 201 for the entry corresponding to that code (if not already done), and thereby determines the second vehicle's wireless address. The first vehicle 203 then transmits the message 208 to the second vehicle 204, which the second vehicle 204 receives and, cooperating with the first vehicle 203, avoids the imminent collision.

In another embodiment, the first vehicle 203 may be configured to read the connectivity codes of all vehicles as soon as they come into view, and determine their wireless addresses automatically, and store the address codes in memory until the second vehicle moves out of view or out of range. In that case, the first vehicle 203 may already know the second vehicle's wireless address when the emergency arises, thereby saving precious milliseconds.

In yet another embodiment, the second vehicle's connectivity matrix 206 may provide its wireless address directly encoded in the connectivity code, as shown in FIG. 1A for example. In that case, the first vehicle 203 does not need to refer to the wireless address tabulation 201, but instead can read the wireless address directly from the second vehicle's connectivity matrix. The first vehicle 203 can then transmit the message 208 to the second vehicle 204 using that address, thereby avoiding the delay of interrogating the wireless address tabulation.

Figure 2B:
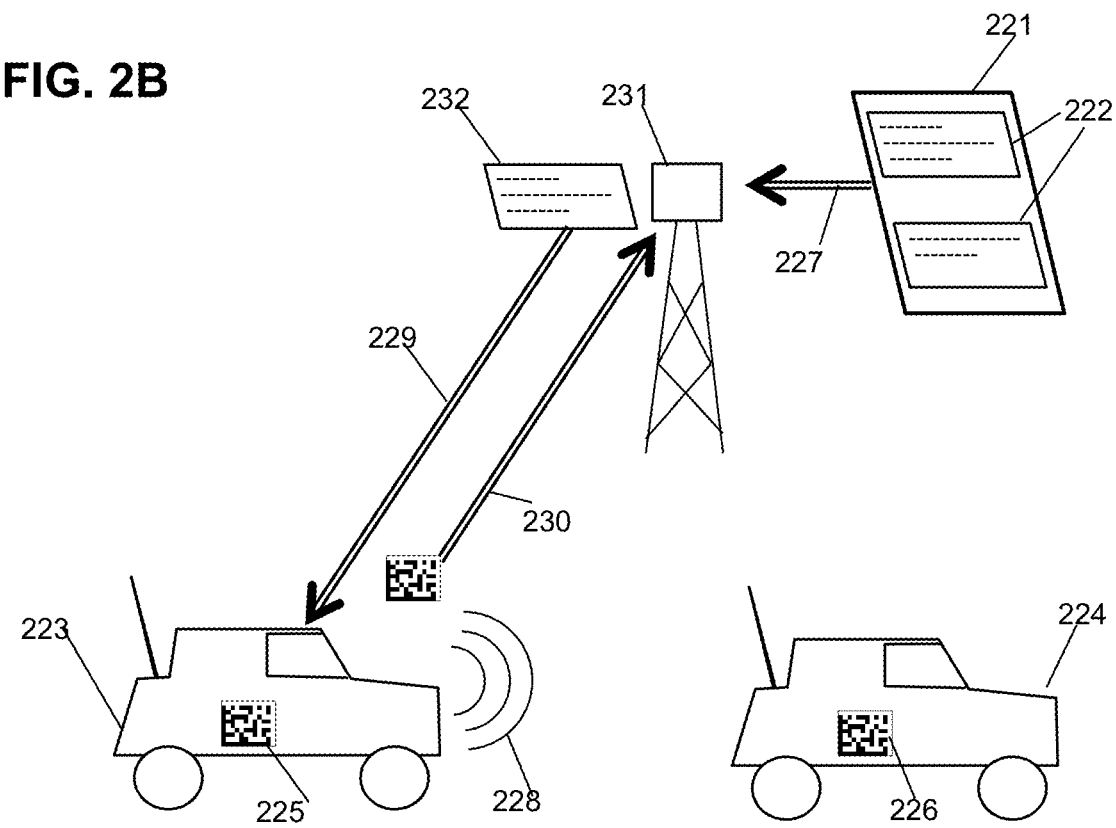
FIG. 2B is a schematic sketch of another exemplary embodiment of a wireless address tabulation, according to some embodiments.

FIG. 2B is a schematic sketch of another exemplary embodiment of a wireless address tabulation, according to some embodiments. As depicted in this non-limiting example, a base station 231 or access point, depicted as an antenna, has previously obtained a copy of the wireless address tabulation 221, as indicated by the arrow 227. The wireless address tabulation 221 includes entries 222 associated with connectivity codes on vehicles. A first vehicle 223 displays a first connectivity matrix 225, and a second vehicle 224 displays a second connectivity matrix 226. An emergency arises, and sensors on the first vehicle 223 can read the second connectivity matrix 226 of the second vehicle 224. Then, the first vehicle can transmit a wireless message 230 to the base station 231 including the data in the second connectivity matrix 226. The message may include an image of the connectivity matrix or, much more compactly, the 100-bit value encoded therein. The base station 231 then finds the entry 232 corresponding to that connectivity code 226 and transmits the corresponding wireless address 229 back to the first vehicle 223. The first vehicle 223 thereby determines the wireless address of the second vehicle 224, and transmits a message 228 to the second vehicle 224, enabling cooperating to avoid the collision.

In another embodiment, the first vehicle 223 may be configured to read the second vehicle's connectivity matrix 226, interrogate the base station, receive the associated entry 229, and thereby determine the second vehicle's wireless address before the emergency occurred, such as determining the wireless address as soon as the second vehicle comes into view. By checking the wireless addresses of proximate vehicles automatically, the first vehicle 223 may be able to initiate communications more rapidly than otherwise.

Figure 3:
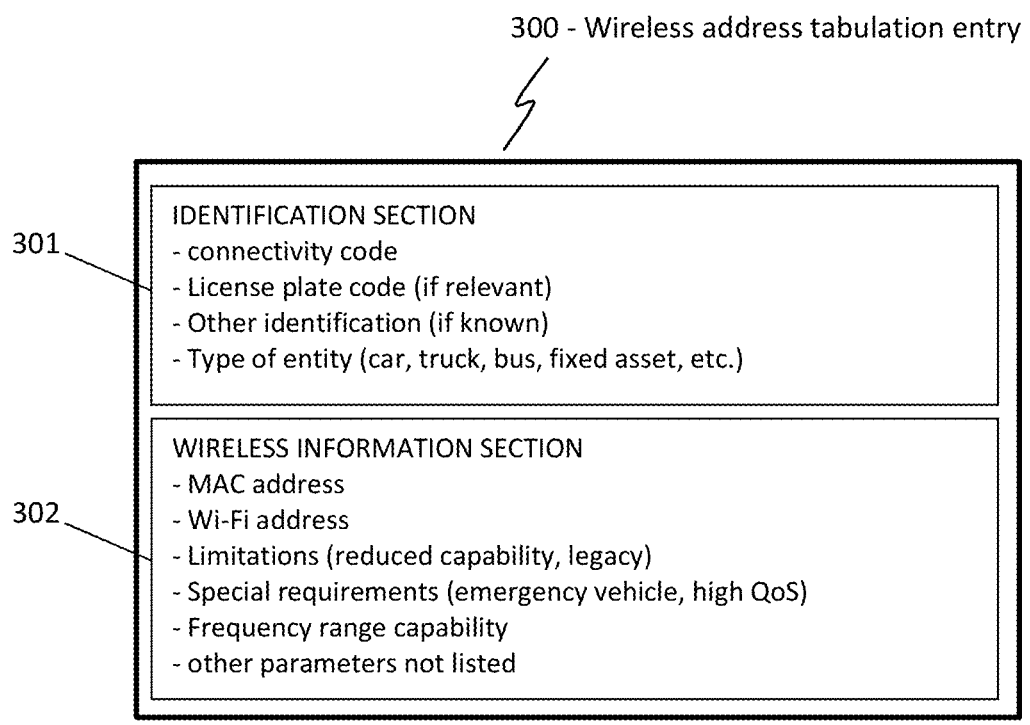
FIG. 3 is a schematic showing an exemplary embodiment of a single entry in a wireless address tabulation, according to some embodiments.

FIG. 3 is a schematic showing an exemplary embodiment of an entry of a wireless address tabulation, according to some embodiments. As depicted in this non-limiting example, the entry 300 may be associated with a particular connectivity code and a particular wireless address of a particular entity such as a vehicle. The entry 300 may include one or more sections, each section providing different information about the associated vehicle or entity. In the depicted example, the entry 300 includes an identification section 301 including the connectivity code that the entry 300 corresponds to, and optionally the associated license plate code, the type of entity involved, and other public information if known. The entry 300 also includes a wireless information section 302 including the wireless address, such as the MAC address and/or a Wi-Fi address of the associated entity's processor, along with optionally any limitations or special requirements, among other information as available.

Figure 4:
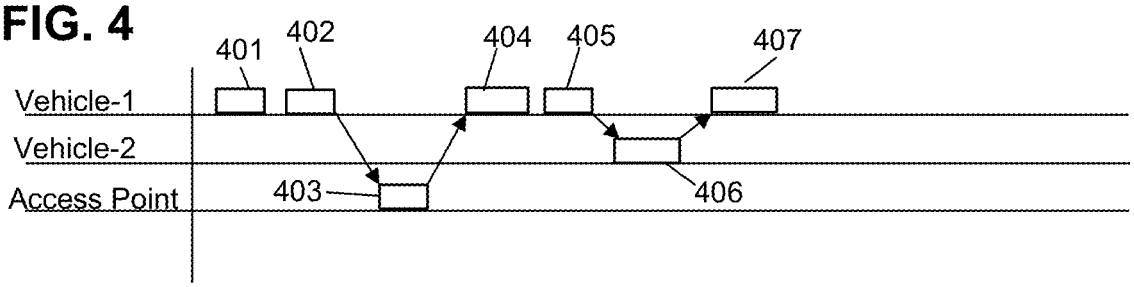
FIG. 4 is a sequence chart showing an exemplary embodiment of a procedure for a vehicle to initiate wireless communication with another vehicle, according to some embodiments.

FIG. 4 is a sequence chart showing an exemplary embodiment of a procedure for a vehicle to initiate wireless communication with another vehicle, according to some embodiments. As depicted in this non-limiting example, actions of two vehicles are shown as boxes on horizontal lines, and actions of a base station or access point are shown on a third line. The horizontal axis represents time. Causation is indicated by tilted arrows accounting for the time delay of signals or actions. Vehicle-1 first views Vehicle-2 at 401 and determines the connectivity code displayed on Vehicle-2's matrix. Vehicle-1 transmits a request message 402 to a connectivity manager via the base station. The connectivity manager replies via the base station with a message 403 indicating the wireless address of Vehicle-2. Vehicle-1 receives the message 404 and then transmits an emergency message 405 to Vehicle-2. Vehicle-2 receives the message at 406 and responds with an acknowledgement 407 which Vehicle-1 receives. In this way, using the connectivity matrix and the remote wireless address tabulation, Vehicle-1 has established unicast communication with Vehicle-2.

In another embodiment, Vehicle-1 may download the wireless address tabulation from a portal, such as a base station, or from an Internet connection, or other link in communication with the connectivity manager. Then, upon viewing the connectivity matrix on Vehicle-2 and reading its connectivity code, Vehicle-1 may look up the corresponding entry in its copy of the wireless address tabulation, and may thereby determine the wireless address of Vehicle-2, and proceed to communicate with Vehicle-2.

In yet another embodiment, Vehicle-2's connectivity code may include an indication of its wireless address, in which case Vehicle-1 may initiate communication with Vehicle-2 upon reading Vehicle-2's matrix, instead of looking for the entry in the wireless address tabulation.

Figure 5A:
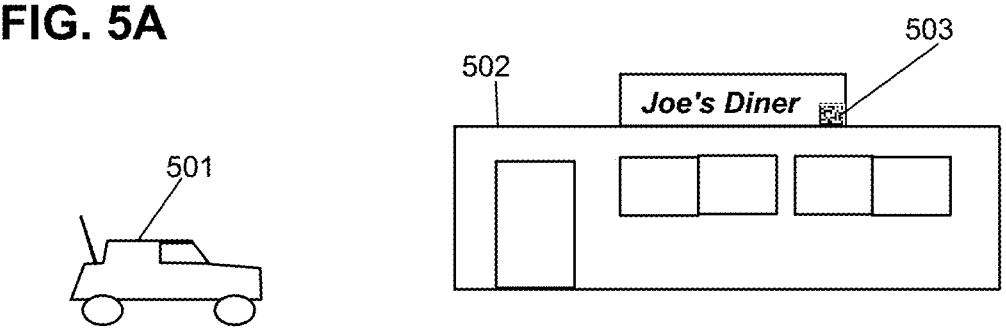
FIG. 5A is a schematic sketch showing an exemplary embodiment of a fixed-asset application, according to some embodiments.

FIG. 5A is a schematic sketch showing an exemplary embodiment of a fixed-asset application, according to some embodiments. As depicted in this non-limiting example, a vehicle 501 such as an autonomous vehicle approaches a fixed asset depicted as a business site 502 which displays a connectivity matrix 503. Upon coming into view of the business 502, the vehicle 501 may read the matrix 503, and determine the wireless address of the business 502, or more specifically, the wireless address of a transceiver in the business 502. The vehicle 501 may then transmit a message to the business 502 such as "Is the fish fresh today?".

Figure 5B:
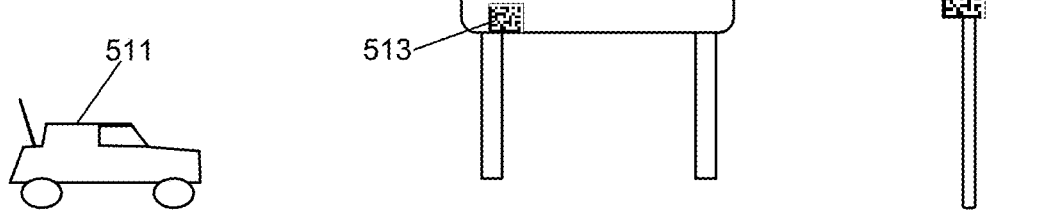
FIG. 5B is a schematic sketch showing an exemplary embodiment of a traffic sign with matrix, according to some embodiments.

FIG. 5B is a schematic sketch showing an exemplary embodiment of a traffic sign, according to some embodiments. As depicted in this non-limiting example, a vehicle 511 approaches a street sign 512 with a connectivity matrix 513 indicating a wireless address. For example, the matrix 513 may indicate the wireless address of a site that provides directions to vehicles that are lost, or other information. For example, the vehicle 511 may transmit a message asking, for example, "Does Maple Avenue cross Main Street?".

Also shown is a traffic signal 514 with another connectivity matrix 515. The vehicle 511 may read the matrix 515, determine a wireless address associated with the traffic signal 514, and transmit a message to it, such as "How long until you change to green?" or "I am a physician and this is an emergency."

Figure 5C:
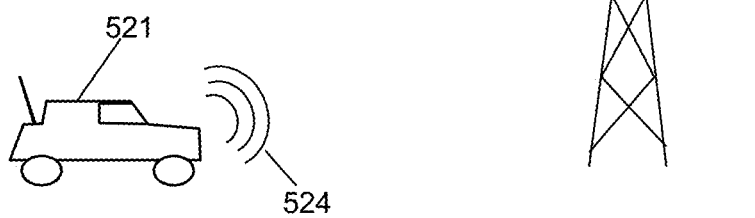
FIG. 5C is a schematic sketch showing an exemplary embodiment of an access point with matrix, according to some embodiments.

FIG. 5C is a schematic sketch showing an exemplary embodiment of an access point with a connectivity matrix, according to some embodiments. As depicted in this non-limiting example, a vehicle 521 is in view of a base station 522 or access point depicted as an antenna with an associated connectivity matrix 523. The matrix 523 may provide an identity that enables the vehicle 521 to obtain, from a wireless address tabulation, the login frequency of the base station 522. The base station's entry in a wireless address tabulation may also include system information needed to register on that base station 522, such as frequencies and bandwidths and network parameters specific to that base station 522, so that the vehicle 521 can then transmit a message 524 and register with the base station 522 without performing complex 5G/6G protocols to find that information. For example, the connectivity matrix 523 may indicate the broadcast frequency of the base station 522 on which the base station 522 transmits system information. The entry may indicate how a user device can communicate with the base station, including specifying one or more additional frequencies or channels on which further system information may be transmitted. In addition, the entry may indicate a frequency or channel on which the user device can transmit a message to the base station, such as a "random access preamble" message requesting registration on that base station, according to some embodiments.

Figure 6A:
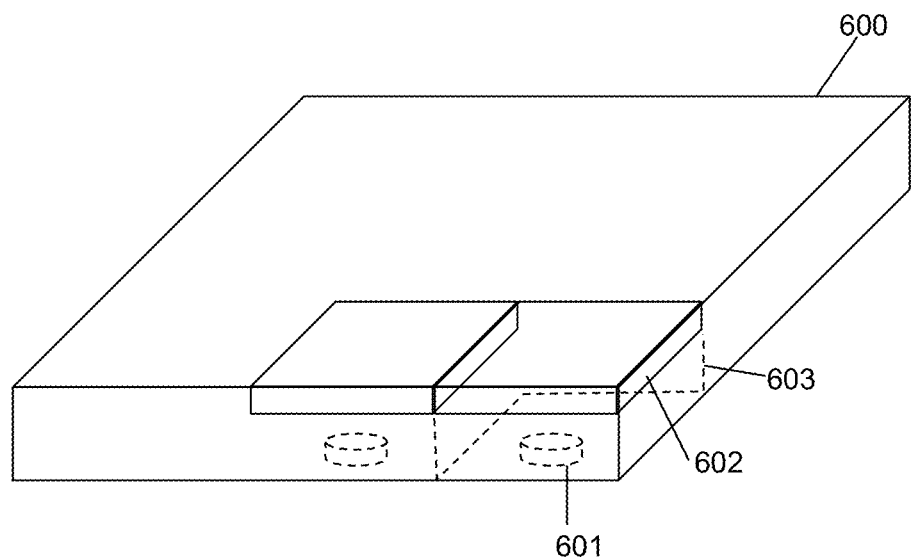
FIG. 6A is a schematic sketch of an exemplary embodiment of a computer-readable matrix with illuminators, according to some embodiments.

FIG. 6A is a schematic sketch of an exemplary embodiment of a computer-readable connectivity matrix with illuminators, according to some embodiments. As depicted in this non-limiting example, an illuminated variable connectivity matrix 600 may include, in each field of the matrix 600, an illuminator 601 (dashed, interior) such as an LED, an opaque separator 603, and optionally a diffuser 602. The LEDs 601 may be powered according to the connectivity code, with the LEDs 601 powered in the white fields and unpowered in the black fields. Illumination may enhance visibility, especially at night. In addition, the connectivity code may be changed by powering different LEDs 601. In addition, the connectivity matrix 600 may be turned off (rendered all black) by depowering all of the LEDs 601.

Figure 6B:
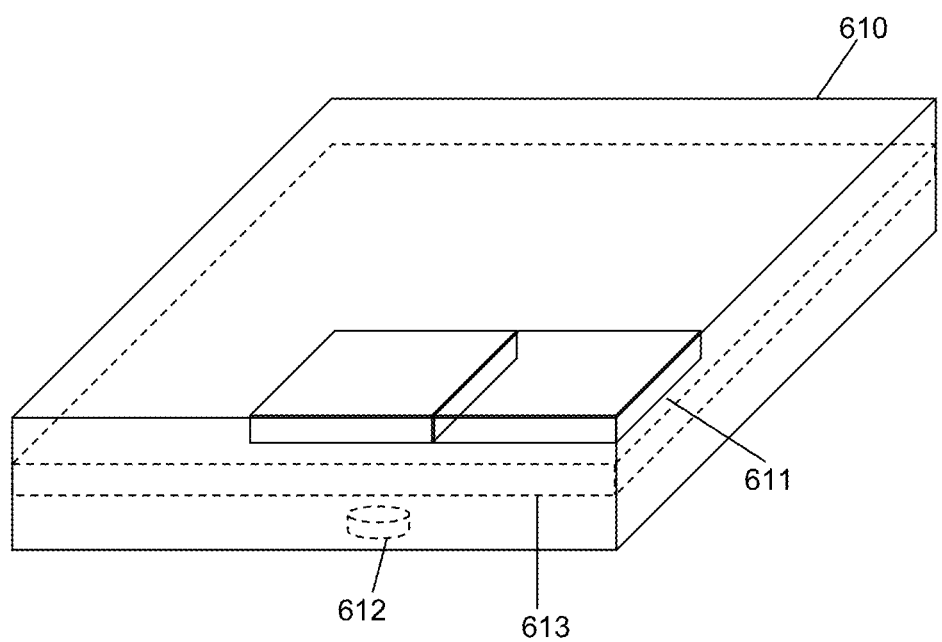
FIG. 6B is a schematic sketch of another exemplary embodiment of a computer-readable matrix with illuminators, according to some embodiments.

FIG. 6B is a schematic sketch of another exemplary embodiment of a computer-readable connectivity matrix with illuminators, according to some embodiments. As depicted in this non-limiting example, a connectivity matrix 610 may include a variable-transmissive window 611 such as a liquid-crystal film for each field of the matrix, connected to a voltage source (not shown) configured to control whether the window 611 is transparent or opaque. In addition, one or more illuminators 612 may be mounted behind an optional diffuser 613 for back-illuminating the various windows 611. By arranging voltages to the various windows 611, the connectivity matrix 610 may be altered to show different codes, and may be turned off by depowering the illuminators 612. For enhanced visibility at night, a reflective backing such as a retro-reflective film (not shown) may be included to reflect incoming light.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the vehicle, an inserted memory chip, hard drive, flash drives, flash memory, optical media, magnetic media, or any other type of file—storing medium. The outputs may be delivered to a user by way of signals transmitted to vehicle steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where vehicle controls are contemplated, the plural inputs may allow plural users to input relevant data at the same time.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A wireless entity comprising:
   a) a matrix comprising a plurality of square or rectangular fields, the matrix displayed visually in or on the wireless entity, the fields arranged in a rectangular array, each field colored either black or white according to a binary code, the binary code comprising data related to a wireless address of the wireless entity;
   b) wherein the binary code indicates an index of a particular entry of a tabulation, the tabulation comprising a plurality of entries, each entry related to a wireless vehicle or a wireless fixed asset, respectively, and each entry indicating the wireless address of the related wireless vehicle or wireless fixed asset.

2. The wireless entity of claim 1, wherein the wireless entity is configured to communicate according to 5G or 6G technology.

3. The wireless entity of claim 1, the matrix further comprising a border comprising further fields arranged peripherally around the matrix and colored black or white according to a predetermined pattern.

4. The wireless entity of claim 1, wherein the binary code further indicates the wireless address of the wireless entity.

5. The wireless entity of claim 1, wherein the wireless entity comprises a first vehicle, and the matrix is further configured to indicate, to a second vehicle, the wireless address of the first vehicle.

6. The wireless entity of claim 5, wherein the matrix is configured to be readable by a camera on the second vehicle from a predetermined distance, the predetermined distance in the range of 20 to 100 meters.

7. The wireless entity of claim 1, wherein each field has a predetermined size in the range of 5 to 20 millimeters.

8. The wireless entity of claim 1, wherein the wireless entity is a base station of a wireless network, and the code comprises a frequency of a broadcast channel of the base station.

9. The wireless entity of claim 1, wherein the entity is a fixed asset comprising a traffic signal or a highway sign or a roadside building and the code further indicates a wireless address of a receiver associated with the wireless entity.

10. The wireless entity of claim 1, wherein:
   a) each field comprises an illuminator, respectively;
   b) each illuminator is powered individually; and
   c) the code is determined by which of the illuminators are powered and which of the illuminators are unpowered.

11. The wireless entity of claim 1, wherein:
   a) each field comprises a filter, respectively, each filter having an individually controllable opacity; and
   b) the code is determined by which of the filters are controlled to have a high opacity and which filters are controlled to have a low opacity.

12. The wireless entity of claim 1, wherein the matrix further comprises 48 fields colored black or white according to a MAC (medium access code) address, surrounded by a border comprising 32 fields colored black or white according to a predetermined pattern.

13. Non-transitory computer-readable media in a first vehicle, the media including instructions that when executed by a computing environment cause a method to be performed, the method comprising:
   a) detecting, in or on a second vehicle, a connectivity matrix comprising a plurality of fields colored black or white according to a code; and
   b) determining, from the code, a wireless address of the second vehicle;
   c) wherein the determining of the wireless address comprises:
   d) retrieving, from a tabulation of entries, a particular entry according to the code; and
   e) determining, from the particular entry, the wireless address of the second vehicle.

14. The media of claim 13, the method further comprising transmitting, according to the wireless address, a message to the second vehicle.

15. The media of claim 13, wherein the code is configured to indicate whether the second vehicle is autonomous or semi-autonomous or human-driven.

16. A base station of a wireless network, the base station comprising:
   a) a visibly displayed connectivity matrix comprising a plurality of fields arranged in a rectangular array, each field colored black or white according to a code, the code configured to indicate a particular entry, in a tabulation of entries, according to the code, the particular entry comprising a particular frequency; and
   b) a transmitter configured to transmit system information messages on the particular frequency.

17. The base station of claim 16, wherein the system information messages indicate how user devices can become registered with the base station.

18. The base station of claim 16, further comprising a receiver configured to receive messages on a second frequency, different from the particular frequency, the second frequency indicated in the system information messages.

* * * * *